A. A. HILL.
HOSE COUPLING.
APPLICATION FILED JULY 29, 1908.
936,627.  Patented Oct. 12, 1909.
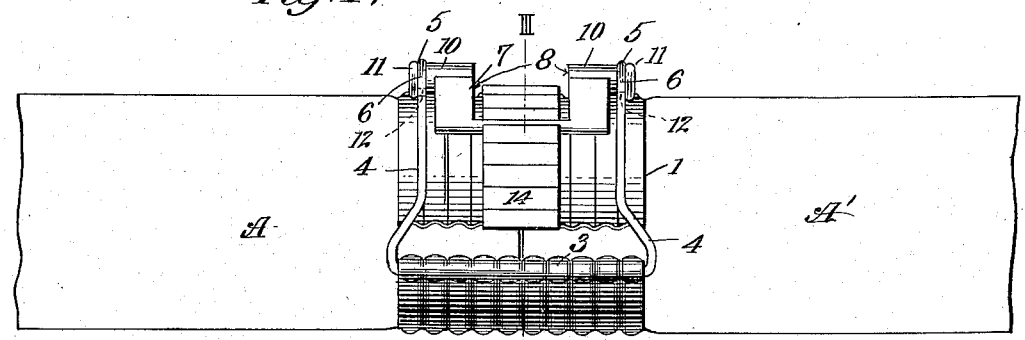
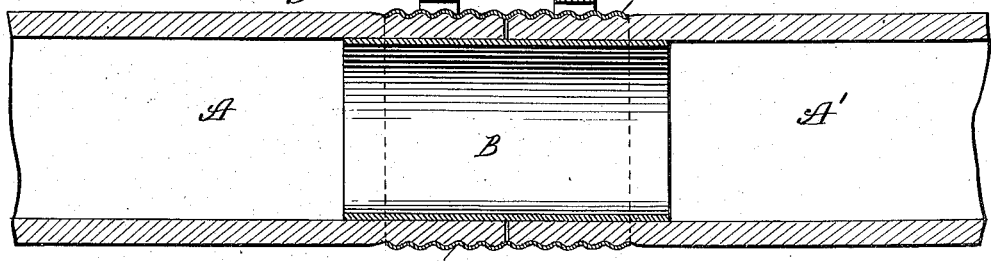
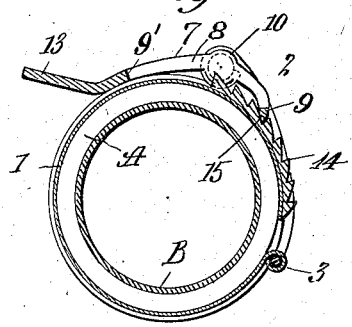
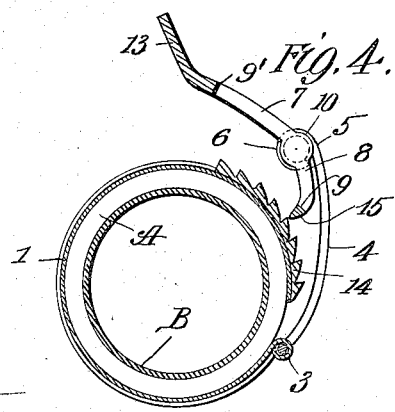
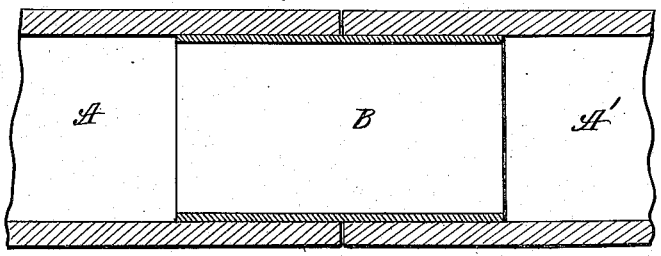
Witnesses:
Inventor
Arthur A. Hill
By his Attorneys
Rosenbaum Stockbridge

UNITED STATES PATENT OFFICE.

ARTHUR A. HILL, OF NEW YORK, N. Y.

HOSE-COUPLING.

936,627.

Specification of Letters Patent.

Patented Oct. 12, 1909.

Application filed July 29, 1908. Serial No. 445,887.

*To all whom it may concern:*

Be it known that I, ARTHUR A. HILL, a citizen of the United States, residing at the city of New York, in the borough of the Bronx and State of New York, have invented certain new and useful Improvements in Hose-Couplings, of which the following is a full, clear, and exact description.

My invention relates to hose couplings, the general object being to provide a simple compact construction, adapted to be conveniently applied to a pair of ordinary hose pipe sections so as to join or connect the same with very great security, but in such a manner that they are quickly detachable or separable whenever desired. With this general object in view, I provide a form of hose coupling having a corrugated sheet metal body and a clasp or clamp which accords or adjusts the coupling to hose of varying dimensions, and automatically springs into its locking or clamping relation without the use of any auxiliary holding means. I have particularly designed a form of clasp or clamp which shall have great strength and rigidity in use, so as not to yield and loosen the hose sections under the fluid pressure within the hose, or by reason of wear or usage.

An incidental object of the invention is to provide a clamp which is very compact in its assembled position upon the hose, taking up comparatively little room, but adapted to be readily engaged and manipulated for the purpose of detaching or separating the connection.

With these and various other objects in view my invention consists in the features of construction and combination as hereinafter set forth and claimed.

In the drawings: Figure 1 is a side elevation of a hose coupling embodying the principles of my invention. Fig. 2 is a longitudinal sectional view of the same. Fig. 3 is a transverse sectional view on the line III—III of Fig. 1. Fig. 4 is a similar view showing the coupling in its detached or opened condition. Fig. 5 shows a pair of alined hose sections in readiness to receive the hose coupling.

1 designates a band, strap, or collar of substantially circular outline, which is adapted to be received over the alined hose sections and tightened thereon to constitute the sleeve portion of the coupling. In practice I make the part 1 of a strip of corrugated sheet metal bent into a substantially circular outline to surround the hose sections, the corrugations running equatorially or in a plane normal to the axis of the hose.

2 designates a clamp or clasp coöperating with the strap 1 to tighten the latter in use. The form of clamp employed is adapted to adjust the hose coupling to varying sizes of hose, and to operate with great strength and rigidity in use.

One end of the strap 1 is bent over to form a transversely extending eye 3 in which there is pivoted a wire loop 4 of substantially U-shape, with its free ends 5 extending outward away from the eye of the strap. At their extremities the ends 5 of this loop 4 are bent forwardly and inwardly to form eyes 6 constituting pivots for the clamping lever.

7 designates the clamping lever which is made in the form of a bent plate with its central portion entirely cut-away to form a rectangular recess 8 extending from a point 9 near the forward extremity of the lever, to a point 9' a considerable distance back on the lever, in accordance with principles of construction which will be later on more fully made clear. The main or body portion of the clamping lever 7 is curved on an outline having a generally sharper radius of curvature than that of the strap 1. On an intermediate transverse axis of this curved body portion of the clamping lever 7 are provided integral laterally projecting trunnions 10 with enlarged outer ends 11 and grooves 12 adjacent thereto, which receive the eyes 6 of the wire loop 4. The trunnions 10 terminate flush with the edges of the recess 8 on their inside ends, so that the form and character of this recess is not altered in any way by the provision of the pivotal supports for the lever. At its rear end 13 the clamping lever is deflected sharply upward for a short distance, as clearly shown in Figs. 3 and 4.

Upon the strap 1 at the end thereof opposite to that of the loop or eye 3, there is provided a curved rack 14, the teeth of which are directed toward the forward end of the clamping lever 7. The rack 14 is preferably made heavily and rigidly of metal integrally soldered to the end of the strap 1 so as to be very firmly secured thereto. The rack 14 may be made of considerable angular extent on the hose coupling, amounting for example, to about 90° of its circumferential arc. The lateral width of this rack is made less than the lateral width of the recess 8 in the clamping lever, and said recess should be long enough, in the manner already mentioned, to receive within it substantially the entire lineal extent of the rack 14. The teeth of the rack 14 are adapted to be engaged by the forward extremity or dog 15 of the clamping lever, and, in order to insure a positive engagement, the end of the lever is deflected slightly downward and slightly pointed at its outer extremity 15.

In use a pair of hose sections A A' to be connected are assembled upon a tubular thimble B, after which the hose coupling is applied by simply slipping it over the joint of the hose sections, engaging the dog 15 of the clamping lever against the rack teeth 14, and depressing the handle 13 until the lever brings up against the wall of the hose coupling. This movement of the lever tightens the clamp by a toggle joint action on account of the increasing efficiency of the pull which is exerted through the wire loop 4. As will be evident from Figs. 3 and 4, the lever is thrown past the center in this action, that is to say, the line of pull or tension of the lever on the operating loop 4 is inside of the point of engagement of its dog 15 with the rack teeth 14 when fully clamped, so that the lever is automatically held in place by the tension of its clamping action. It is, however, adapted to be released by pulling outward on the handle 13, which first loosens the clamp and subsequently disengages it from its holding rack in an obvious manner. The engagement of the lever with the rack 14 is made with a tooth as far along on the series as convenient, so that when the lever is tightened, the coupling will be bound upon the hose as firmly and securely as possible.

In the action of the coupling, the corrugations of the strap 1 take an important part. As will be evident from Fig. 2, the hose is crimped inward on a series of transverse planes by the action of the corrugations. By this means the hose sections are clamped upon the interior thimble in a perfectly fluid-tight manner, even though a comparatively slight clamping pressure is provided. It will be evident, however, that the nature of the present clamp, and its method of use, insures a clamping pressure which will be adequate for any circumstances of operation.

While I have illustrated a thimble B in Figs. 2 and 5, it is to be understood that this is not always essential, since some hose is sufficiently thick or rigid to permit dispensing with the thimble altogether. This is particularly true where the hose contains an interior layer of spiral spring wire which has sufficient rigidity to take the place of the thimble B. It will be evident that the present coupling clamps in all its relations with equal facility on account of the recess 8 which receives the rear projecting portion of the rack 14 when the dog is engaged upon the forward or initial teeth thereof, corresponding to the lowermost or right hand teeth in the particular illustration of Figs. 3 and 4.

What I claim is:

In a hose coupling, a strap adapted to encircle the hose and bent to form an eye at one end, a wire loop passing through said eye and itself having eyes at its extremities, a rigid curved rack integrally fixed upon the other end of said strap, and a lever having integral trunnions pivoted to the eyes of said loop and cut-away in a rectangular outline throughout its central portion to expose said rack, said lever having a downwardly directed front edge extending entirely across its width to engage the teeth of said rack and having an upwardly deflected rear extremity 13 adapted to be conveniently grasped and manipulated when the clamp is tightened.

In witness whereof, I subscribe my signature, in the presence of two witnesses.

ARTHUR A. HILL.

Witnesses:
  WALDO M. CHAPIN,
  JAMES D'ANTONIO.